US008856339B2

(12) United States Patent
Mestery et al.

(10) Patent No.: US 8,856,339 B2
(45) Date of Patent: Oct. 7, 2014

(54) AUTOMATICALLY SCALED NETWORK OVERLAY WITH HEURISTIC MONITORING IN A HYBRID CLOUD ENVIRONMENT

(75) Inventors: Kyle Andrew Donald Mestery, Woodbury, MN (US); David Chang, Milpitas, CA (US); Murali Anantha, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 13/438,863

(22) Filed: Apr. 4, 2012

(65) Prior Publication Data

US 2013/0268799 A1    Oct. 10, 2013

(51) Int. Cl.
*G06F 15/173*    (2006.01)
*G06F 15/16*    (2006.01)

(52) U.S. Cl.
USPC ............................ 709/226; 709/246; 709/227

(58) Field of Classification Search
USPC ......................................................... 709/226
See application file for complete search history.

(56) References Cited

U.S. PATENT DOCUMENTS

| | | | | |
|---|---|---|---|---|
| 2009/0235174 | A1* | 9/2009 | Royt ............................. | 715/735 |
| 2010/0131636 | A1 | 5/2010 | Suri et al. | |
| 2011/0209064 | A1* | 8/2011 | Jorgensen et al. ............ | 715/733 |
| 2011/0261828 | A1 | 10/2011 | Smith | |
| 2012/0117563 | A1* | 5/2012 | Chang et al. ...................... | 718/1 |

FOREIGN PATENT DOCUMENTS

WO    2009155574 A1    12/2009

OTHER PUBLICATIONS

AdventNet, "CORBA Northbound Tutorial," Web NMS 4, Release 4.7.0, AdventNet, INc., 1996-2002.
IDC, White Paper, "Architecting the Network for the Cloud," Jan. 2011.
Cisco Systems, Inc., VMware, Inc., "Joint Cisco and VMware® Solution for Optimizing Virtual Desktop Delivery," 2008.
Extended European Search Report in counterpart European Application No. 13160467.7, mailed Jun. 5, 2013.

* cited by examiner

*Primary Examiner* — Kevin Bates
*Assistant Examiner* — Emad Siddiqi
(74) *Attorney, Agent, or Firm* — Edell, Shapiro & Finnan, LLC

(57) ABSTRACT

Techniques are provided for a management application in a first virtual network to start a first cloud gateway in the first virtual network. First messages are sent to a second virtual network, the first messages comprising information configured to start a second cloud gateway and a first virtual switch in the second virtual network. A connection is established between the first cloud gateway and the second cloud gateway, where the first cloud gateway, the second cloud gateway, and the first virtual switch form a first scalable cloud network element. One or more second messages are sent to the second virtual network, the one or more second messages comprising information configured to start a virtual machine and a first virtual machine interface configured to allow the virtual machine to access processing resources in the second virtual network. Data are stored that associates the virtual machine with the first virtual switch.

22 Claims, 9 Drawing Sheets

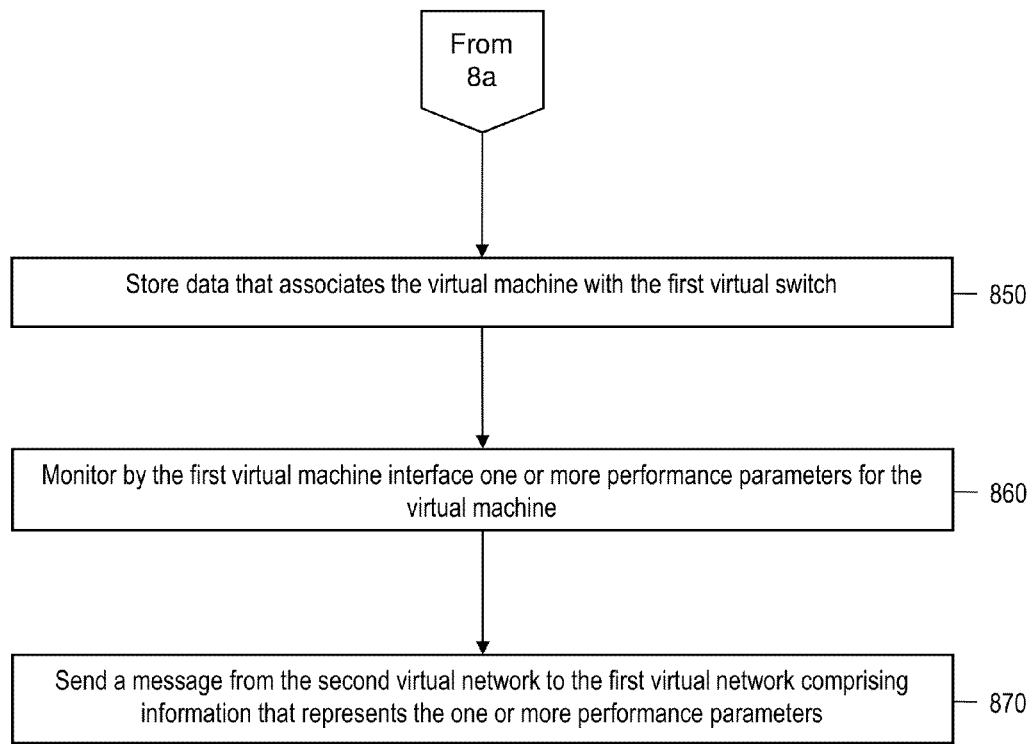

AUTOMATICALLY SCALED NETWORK OVERLAY WITH HEURISTIC MONITORING IN A HYBRID CLOUD ENVIRONMENT

TECHNICAL FIELD

The present disclosure relates to scaling and monitoring virtual network components in a hybrid cloud environment.

BACKGROUND

Data centers may host applications and store large amounts of data for an organization or multiple organizations. An enterprise data center or "cloud" may be privately owned and discretely provide services for a number of customers, with each customer using data center resources by way of private networks. In addition, these data centers provide server and desktop virtualization that is dramatically changing enterprise network by creating many "virtual networks" which connect virtual machines and the physical networks through virtual switches.

When an enterprise data center starts to run out of capacity, the enterprise cloud operator may opt to buy more hardware, but this permanently increases hardware and operational costs. Another solution for increasing capacity is to "borrow" or lease resources from a public cloud data center, thereby only temporarily increasing data center costs during the lease period. When the enterprise data center leases capacity from a public or cloud data center, the combination of the enterprise cloud and public cloud is referred to as a "hybrid" cloud. The hybrid cloud is achieved by way of an overlay network. However, this overlay network has certain issues with respect to dynamic bandwidth scaling and failover redundancy that are a necessity in modern networks.

BRIEF DESCRIPTION OF THE DRAWINGS

FIGS. 8a and 8b illustrate a flowchart of a process for managing CNEs according to the techniques described herein.

DESCRIPTION OF EXAMPLE EMBODIMENTS

Overview

Dynamic bandwidth scaling and failover redundancy issues of an overlay network between an enterprise cloud network (first virtual network) and a public cloud network (second virtual network) are addressed according to the techniques described herein. A management application in a first virtual network starts a first cloud gateway in the first virtual network. One or more first messages are sent to a second virtual network comprising information configured to start a second cloud gateway and a first virtual switch in the second virtual network. A connection is established between the first cloud gateway and the second cloud gateway, where the first cloud gateway, the second cloud gateway, and the first virtual switch form a first scalable cloud network element. One or more second messages are sent to the second virtual network, the one or more messages comprising information configured to start a virtual machine and a first virtual machine interface configured to allow the virtual machine to access processing resources in the second virtual network. Data are stored that associates the virtual machine with the first virtual switch. The first virtual machine interface monitors one or more performance parameters for the virtual machine, and a message is sent from the second virtual network to the first virtual network comprising information that represents the one or more performance parameters.

Example Embodiments

Figure 1:
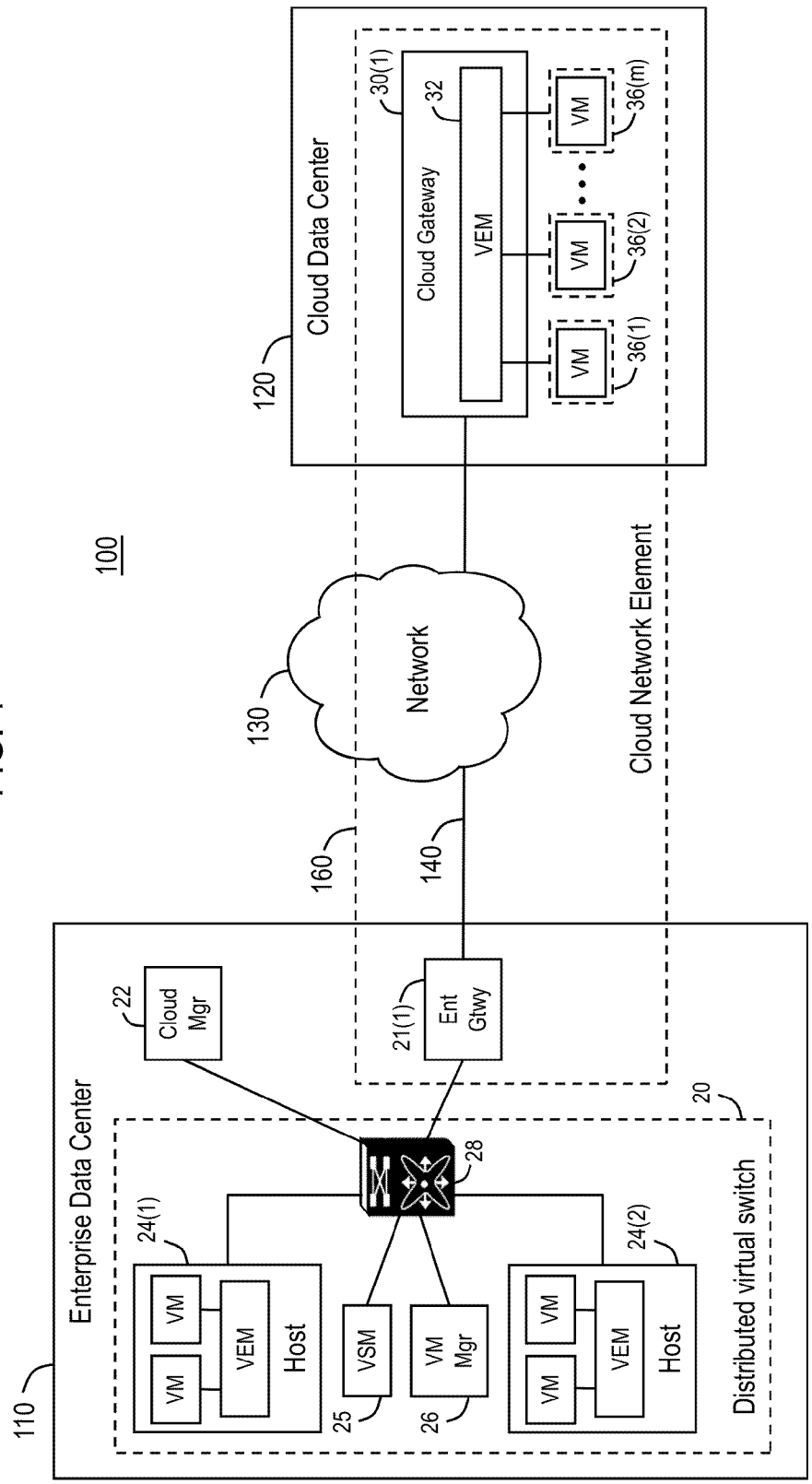
FIG. 1 is an example of a block diagram of a hybrid cloud network with an enterprise data center and a cloud data center that employ a scalable cloud network element (CNE) according to the techniques described herein.

Referring first to FIG. 1, an example system 100 is shown for a hybrid data center. System 100 comprises an enterprise data center 110 and a cloud data center 120. The data centers 110 and 120 communicate with each other by way of link 140 over a network 130, e.g., the Internet or a virtual private network. The data center 110 employs a switch 28 for hosting hardware and software that form a distributed virtual switch (DVS) 20. The switch 28 comprises a plurality of host devices 24(1) and 24(2), and hosts a virtual supervisor module (VSM) 25, a virtual machine (VM) manager 26, and a cloud manager 22. The host devices 24(1) and 24(2) may be line cards in the switch 28 and each host device hosts VM software components and a software switching module referred to herein as a Virtual Ethernet Module (VEM), as shown. The host devices 24(1) and 24(2), VSM 25, VM manager 26 form the distributed virtual switch 20, as is known in the art. The switch 28 also hosts an enterprise (Ent) gateway 21(1) for communicating over network 130.

The cloud data center 120 hosts a cloud gateway 30(1) and a VEM 32 that provides switching for a plurality of VMs 36(1)-36(m). Each VM in the cloud data center has a shell component sometimes referred to as a container or nested VM container that provides a VM interface to the hardware in the cloud data center. The container is indicated by the dashed box surrounding each VM in the cloud data center. The VM container or interface provides a means for the VM to access cloud data center 120 processing resources while protecting the cloud data center 120 from unauthorized access. In essence the VM shell is responsible for running the enterprise customer's VM as a guest VM, e.g., VMs 36(1)-36(m), and for providing a network overlay for connecting the guest VM to private networks in the enterprise, e.g., enterprise data center 110.

To further illustrate, an agreement is set up between the enterprise owner of data center 110 and the service provider for cloud data center 120, e.g., a service level agreement (SLA). The service provider for data center 120 may be in the business of leasing excess capacity to any entity that needs processing capacity. The SLA allows the enterprise data center to lease resources through a given service arrangement, e.g., pricing, resource allocation, cloud performance, etc.

To extend resources beyond the data center, the cloud manager 22 starts a cloud gateway, e.g., cloud gateway 30(1), using commands authorized by the cloud data center 120, e.g., by way of the SLA. Although not illustrated in FIG. 1, the cloud gateway 32 may have a shell component that acts as a processing resource access intermediary. The enterprise gateway 21(1), the cloud gateway 30(1), and the associated components in cloud data center 120 form a CNE 160. CNE 160 provides a framework for both scaling resource allocation and failover components within each data center, while the VM shells or containers provide for monitoring CNE elements within the cloud data center 110 in order optimize resource allocation and failover within the CNE. This framework is not provided in conventional hybrid cloud environments.

Several management plane concepts are introduced herein. The first concept is the cloud manager, e.g., cloud manager 22, that is a management platform that could be an application or a VM running anywhere in the enterprise. The cloud manager is responsible for providing the hybrid cloud operations, management of cloud resources, dynamic instantiating of cloud gateways and nested VM container components through the enterprise virtualization platform such as the VM manager 26 (e.g. VMWare's vCenter) and cloud provider application interfaces (APIs), e.g. Amazon's Amazon Web Service (AWS) API. The cloud manager also monitors health of all the components and provides high availability (HA) for those components. For ease of use, cloud manager 22 may provide a graphical user interface (GUI) for device and policy management with respect to CNE components.

The cloud manager is responsible for provisioning the required components on demand in order to establish the infrastructure required for running a VM in the provider data center. The cloud manager also performs lifecycle management for the VMs provisioned in the cloud provider. The following are functions that may be provided by cloud manager:

GUI/Management API (e.g., Northbound)
    User/Role Management (e.g., Lightweight Directory Access Protocol (LDAP)/Active Directory (AD) Integration)
    MAC/IP Address Pool Management
    Cloud provider management brokering
    Cloud infrastructure resource management
    Enterprise VM management
    Cloud VM lifecycle management
    VM and/or Cloud gateway image management
    Security certificate management
    Secure tunnel management
    Component monitoring The second management concept is the nested VM container within which the guest VM operates, "guest" referring to a guest with respect to the cloud data center. For example, in a nested virtualization environment running in the cloud data center, the inner most VM, i.e., the guest VM, is often "out of bounds" for the operator that provides the actual migration of services, e.g., the enterprise operator. As such, the out of bound condition makes it difficult for the enterprise operator to monitor the performance of the guest VM. In these cases, there exists a need to transparently collect data that provides a picture of the condition inside the VM, e.g., processor, storage, and memory utilization statistics, as well as fault detection.

Accordingly, a base architecture is created to provide for the automatic scaling and monitoring of components in a hybrid cloud environment. In a virtualized computing environment such as a modern virtualized data center and cloud service provider data center, many capacity planning tools and applications are available for a corporate Information Technology (IT) administrator to accurately allocate network resources on demand, i.e., to automatically scale resources to current need. The base architecture provided herein allows the IT administrator to automatically perform scaling and performance monitoring within the framework of the CNE overlay networks.

The automatic scaling of hybrid cloud workload with multiple CNE instances is based on an extension of DVS technology, e.g., based on a component used by Cisco's Nexus 1000V technology. The CNE forms the building block of the overlay networks described herein. Due to the virtualization technology, the entire CNE component can be allocated on an on-demand basis. For example, when the total number of VMs allocated at to the cloud data center exceeds a certain threshold, a new CNE is allocated for connecting to new cloud resources, or when the number of application and service VMs allocated to the cloud data center continues to grow, additional CNEs are allocated for supplying the network bandwidth required for the hybrid cloud overlay, i.e., the networking pipeline and processing needs.

CNE allocation on-demand is a fundamental aspect of the techniques described herein. Additional techniques are available for coping with complex network bandwidth requirements that are observed in a hybrid data center. Example operations of the base architecture are presented as various use cases below. The use cases are not meant to be limiting, but are provided to illustrate the flexibility of the base architecture.

There are other components in system 100 such as mass storage, core and edge switches, and in switch 28, e.g., hypervisors and line cards, as one ordinary skill in the art would appreciate, but for simplicity, those components are omitted in FIGS. 1-6.

Figure 2:
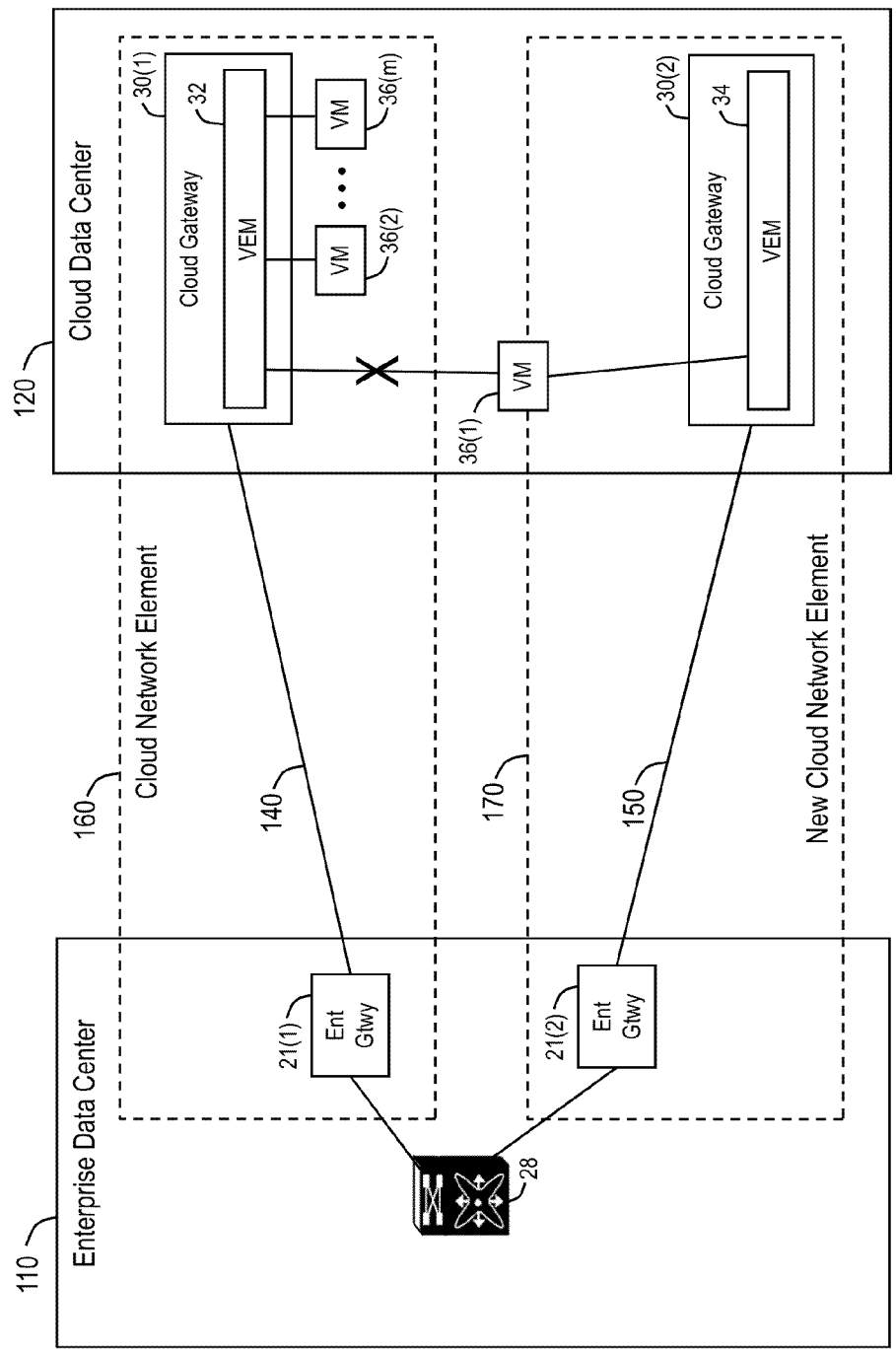
FIG. 2 is an example of a block diagram of relevant portions of the network from FIG. 1 in which a virtual machine (VM) is migrated to a second CNE that is more lightly loaded according to the techniques described herein.

Referring now to FIG. 2, an example block diagram of relevant portions of the network from FIG. 1 is shown in which a VM is migrated from a first CNE to a second CNE that is more lightly loaded. In this example, CNE 160 from FIG. 1 is shown along with a new CNE 170, as indicated by the dashed boxes surrounding the various CNE components. For ease of illustration, these dashed boxes for CNE's are removed from the remaining figures, although it is understood that they are still conceptually present. CNE 170 has an enterprise gateway 21(2), a cloud gateway 30(2) with a VEM 34, and a network overlay connection 150. The network connections 140 and 150 may be achieved by way of a secure tunnel, e.g. a layer 2 tunnel.

In this example, the cloud resource usage in CNE 160 has approached a level that a new CNE 170 was created, or their components are otherwise instantiated. The newly created CNE 170 is less loaded than CNE 160 by virtue of having been "new." As new VMs are started they may be associated with the new CNE 170 instead of CNE 160. In this particular case, however, a VM, e.g., VM 36(1), is migrated from CNE 160 to CNE 170 in order to better allocate resources across the hybrid cloud. For better use of CNE resources, the cloud manager 22 would move more bandwidth "hungry" VMs from an existing CNE to the new CNE, thereby improving the user experience associated with those VMs.

One of the components of a CNE is the cloud VEM, e.g., VEM 32 or 34, that plays the role of a virtual line card for a distribute switch, e.g., a Nexus 1000v DVS. Moving a VM end-point from one line card to another is similar to a layer 2 switch "host move" operation, which imposes minimal state changes within the layer 2 switch. From a processing capacity standpoint, this approach is similar to a VM live migration between two physical hosts within a data center. In this example, the association between VM 36(1) and its switching module VEM 32 is severed or destroyed, as indicated by the "X" in the figure, and re-established with respect to VEM 34, as shown.

Figure 3:
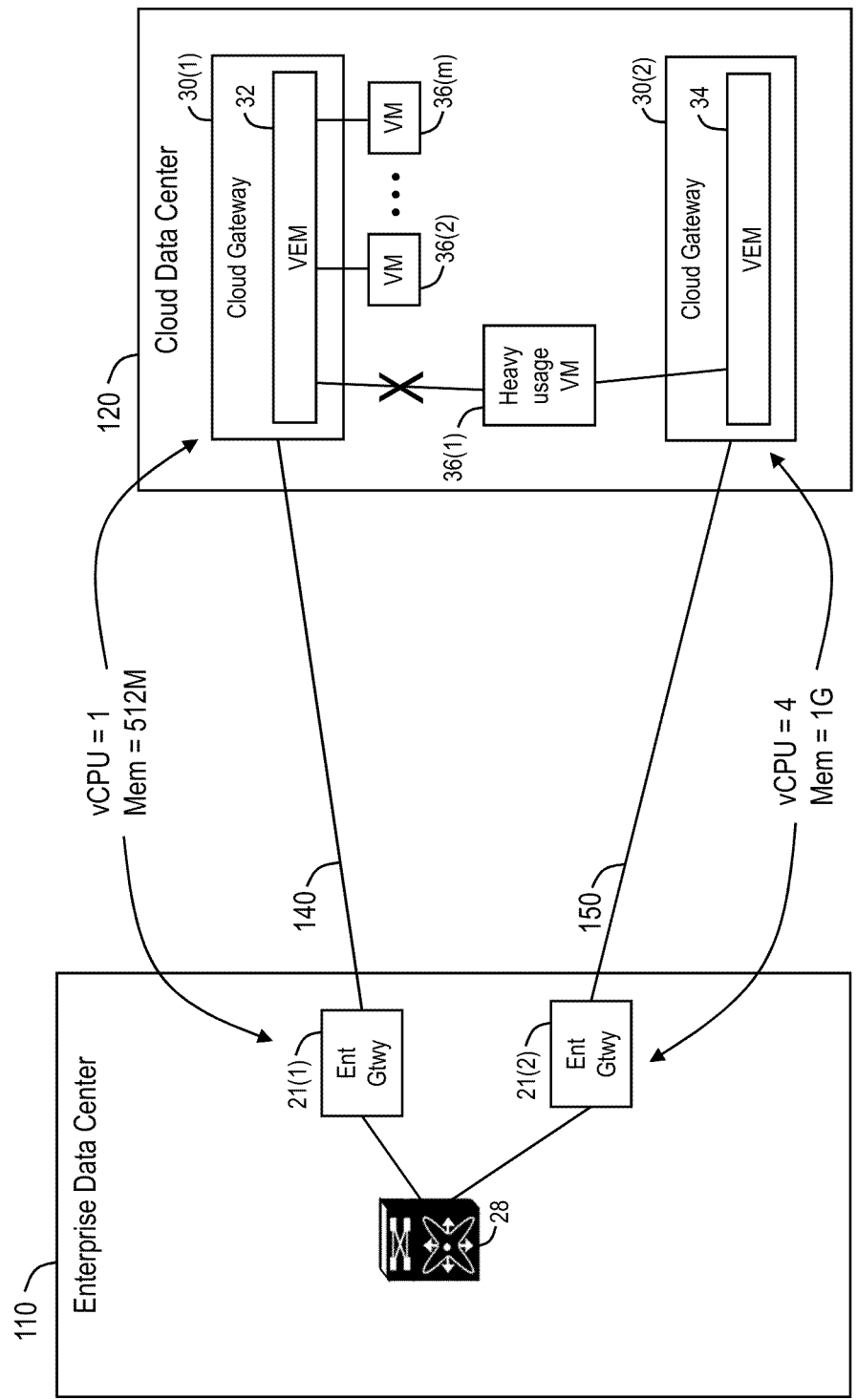
FIG. 3 is an example of a block diagram of relevant portions of the network from FIG. 1 in which a VM is migrated to a second CNE created with a greater processing capacity according to the techniques described herein.

Turning to FIG. 3, an example of a block diagram of relevant portions of the network from FIG. 1 is shown in which a VM is migrated to a second CNE created with a greater processing capacity. When a CNE component is created, e.g., a VM or gateway VMs, the data center operator has to ensure that resources are accounted for. To limit the resources that any particular component may consume, the components are assigned limits on the amount of processing, memory, and disk storage that may be utilized. In a virtualized environment, processing resources on the supporting hardware, e.g., hypervisors, are time sliced into defined units referred to as virtual central processing units (vCPUs), while the memory resources are allocated in Megabytes (M) or Gigabytes (G).

Using the similar "VM move" technique described above, the automatic scaling function can be further enhanced by increase the processing capacity of CNE components. As shown in FIG. 3, the upper components are assigned one processing unit (vCPU=1) and 512 M of memory, and the lower components are assigned four processing units (vCPU=4) and 1 G of memory. When a CNE is servicing application VMs with heavy network traffic load, e.g., virtualized server load balancers, database servers, etc., the cloud manager can allocate a CNE with components equipped with much higher processing capacity and gradually move heavy usage application VMs to the high capacity CNE. In this example, VM 36(1) is a "heavy usage" VM that is migrated from VEM 32 to VEM 34 in much the same manner as described above in connection with FIG. 2.

Figure 4:
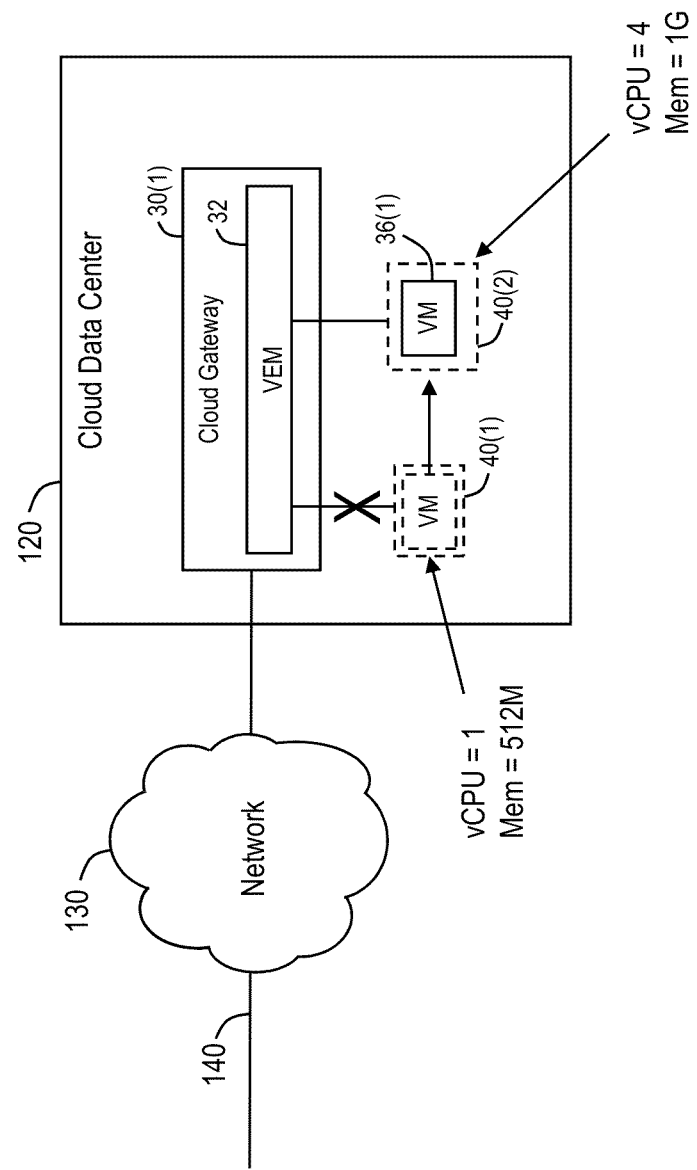
FIG. 4 is an example of a block diagram of relevant portions of the network from FIG. 1 in which a VM is migrated within a CNE between VM containers with differing processing capacities according to the techniques described herein.

Referring to FIG. 4, an example of a block diagram of relevant portions of the network from FIG. 1 in which a VM is migrated within a CNE between VM containers with differing processing capacities. As mentioned above, the nested VM container is a software appliance running as a VM in the cloud data center. The container serves as a computing overlay, which executes the migrated or instantiated VM image and delivery application functions to the end users by using compute, network, and storage resources provided by the cloud data center. After a VM is migrated to the cloud data center, the computing capacity of the VM can be dynamically scaled by deploying a new container with higher or lower vCPUs and memory than originally provisioned, and then migrating the VM to the new container. In this example, VM 36(1) is migrated from a container 40(1) that was provisioned with a vCPU=1 and 256 M of memory, to a container 40(2) that is provisioned with vCPU=4 and 1 G of memory, thereby increasing the resources available to VM 36(1). In the same manner, VMs may be migrated to containers with lower resource capacities.

Figure 5:
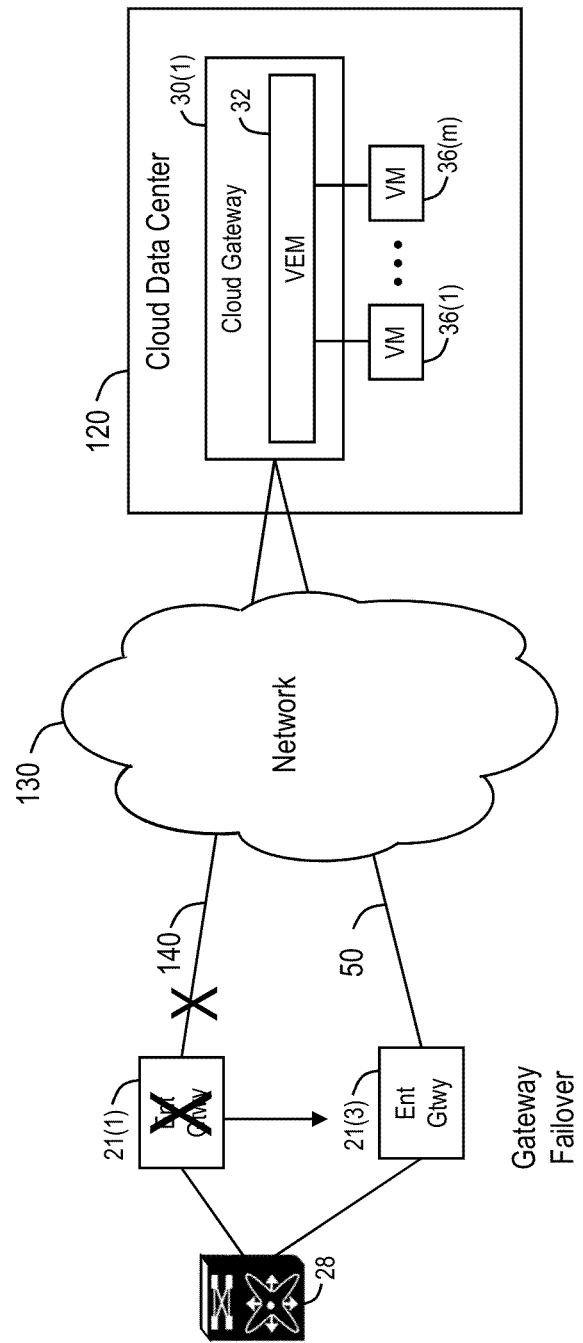
FIG. 5 is an example of a block diagram of relevant portions of the network from FIG. 1 in which an enterprise gateway failover is performed according to the techniques described herein.

Turning to FIG. 5, an example of a block diagram of relevant portions of the network from FIG. 1 is shown in which an enterprise gateway failover is performed according to the techniques described herein. When a single aggregate overlay network tunnel from the customer's data center to the cloud service provider is employed, this single overlay becomes a single point of failure. In order to provide failover redundancy within the hybrid cloud, a second overlay tunnel may be provided. In this example, a second enterprise gateway 21(3) and an associated network communication link 50 are provided. When enterprise gateway 21(1) or link 140 goes down, as indicated by respective "Xs," the enterprise gateway 21(3) and link 50 can take over for the failed components, as indicated by the down arrow in FIG. 5.

Figure 6:
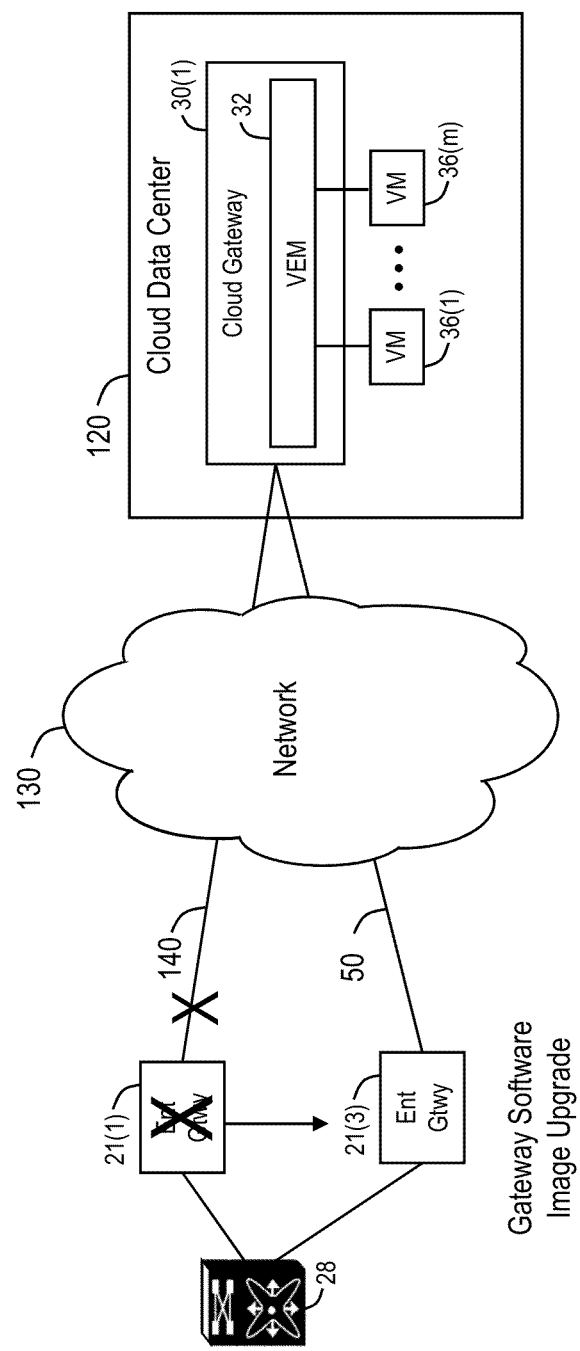
FIG. 6 is an example of a block diagram of relevant portions of the network from FIG. 1 in which an enterprise gateway software image upgrade is performed according to the techniques described herein.

Referring to FIG. 6, a similar technique to that shown in FIG. 5 may be used for software image upgrade. Customers or enterprises deploying overlay networks from their data center to a cloud service provider occasionally need to upgrade software running on CNE components. In this example, enterprise gateway 21(3) is provided with a software upgrade over the software employed by gateway 21(1). The tunnel overlay is failed-over to the new gateway 21(3) using the same or similar techniques described in connection with FIG. 5, with no adverse effects for the customer's traffic traveling over the overlay tunnel from data center to the cloud service provider. The techniques provided in connection with FIGS. 5 and 6, are described from the enterprise data center viewpoint. These techniques are equally applicable to redundancy and software upgrades within the cloud data center for the CNE components operating therein.

Figure 7:
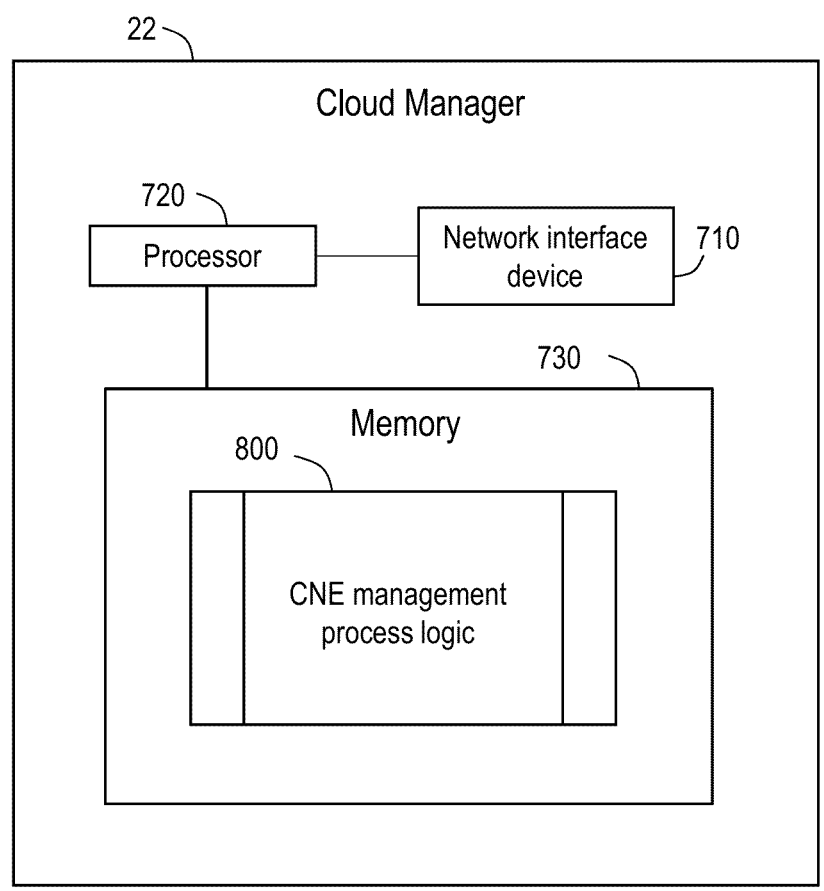
FIG. 7 is an example block diagram of a cloud network management device configured to manage CNEs according to the techniques described herein.

Referring to FIG. 7, an example of a processing or server device that may host a cloud manager, e.g., cloud manager 22, is shown. The device 22 comprises a network interface module or unit 710, a processor 720, and a memory 730. The memory stores instructions for CNE management process logic 800. Briefly, the CNE management process logic 800 is configured to cause the processor in the device 22 to dynamically manage CNE components in the hybrid cloud as described herein. The operations of the CNE management process logic 800 have been described by way of use cases and are described in greater detail in connection with FIG. 8.

The network interface device 710 is configured to enable communications over a network, e.g., network 130 from FIG. 1 and various networks internal to the data centers in the hybrid cloud, to, among other things, manage CNE components in system 100. Processor 720 is coupled to the network interface device 710 and to memory 730. Processor 720 is, for example, a microprocessor or microcontroller that is configured to execute program logic instructions (i.e., software) for carrying out various operations and tasks described herein. For example, the processor 720 is configured to execute CNE management process logic 800 that comprises processor executable software instructions stored in memory 730, in order to manage CNE components. The functions of processor 720 may be implemented by instructions encoded in one or more tangible computer readable media (e.g., embedded logic such as an application specific integrated circuit, digital signal processor instructions, software that is executed by a processor, etc.), wherein memory 730 stores data used for the operations described herein and stores software or processor executable instructions that are executed to carry out the operations described herein.

Memory 730 may comprise read only memory (ROM), random access memory (RAM), magnetic disk storage media devices, optical storage media devices, flash memory devices, electrical, optical, or other physical/tangible memory storage devices. Thus, in general, the memory 730 may comprise one or more tangible (non-transitory) computer readable storage media (e.g., a memory device) encoded with software comprising computer executable instructions and when the software is executed (by the processor 720) it is operable to perform the operations described herein in connection with CNE management process logic 800.

Figure 8A:
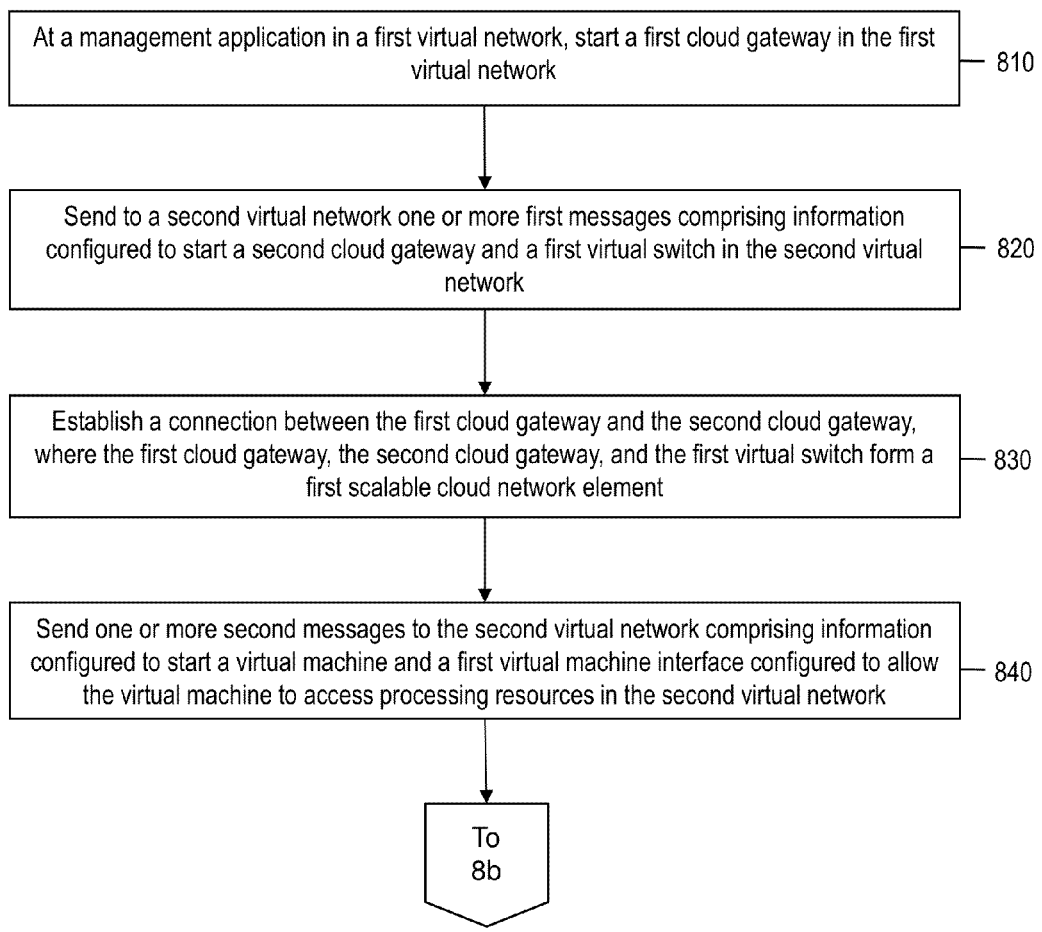

Referring to FIGS. 8a and 8b, a flowchart is shown that depict operations of the process logic 800 for automatic scaling and monitoring, i.e., management, of CNE components. At 810, a management application in a first virtual network starts a first cloud gateway in the first virtual network. At 820, one or more first messages are sent to a second virtual network, the one or more first messages comprising information configured to start a second cloud gateway and a first virtual switch in the second virtual network. At 830, a connection is established between the first cloud gateway and the second cloud gateway, where the first cloud gateway, the second cloud gateway, and the first virtual switch form a first scalable cloud network element. At 840, one or more second messages are sent to the second virtual network, the one or more second messages comprising information configured to start a virtual machine and a first virtual machine interface configured to allow the virtual machine to access processing resources in the second virtual network. At 850, data are stored that associates the virtual machine with the first virtual switch.

At 860, a virtual machine interface, e.g., a nested VM container, monitors one or more performance parameters for the virtual machine. At 870, a message is sent from the second virtual network to the first virtual network comprising information that represents the one or more performance parameters. The above monitoring assumes that the VM is a guest VM running on the cloud inside another container VM, referred to at 860 as a virtual machine interface, since it provides an interface to cloud resources. For example, the virtual machine interface may operate as a thin Portable Operating System Interface (POSIX) process that gathers system statistics from the container VM, and may also communicate to the underlying hardware hypervisor through defined mechanisms, if available.

Data that is collected may include information such as CPU load and memory usage statistics. The list open files (lsof) and state memory (statm) utilities help collect information about the libraries and memory used for hosting the VM. A resident set size helps determine the portion of a process that is hosting the VM resident in random access memory (RAM). Monitoring the resident set size indicates whether or not RAM is being utilized according the VM requirements. Out of Memory (OOM) monitoring is a linux feature that signals when there is a low memory issue, and hence is a useful indication of either a memory leak or a larger system issue.

With the above information, a sequence of heuristic markers may be formed that informs the cloud manager in simple terms whether or not the VM is operating in a healthy state. Furthermore, processor emulators such as QEMU for example, provide a QEMU Monitoring Protocol (QMP) mechanism that enables communication with the guest VM. Hence, a QMP query is useful in situations where the guest VM has a fault or a crash, and the VM container is indifferent to this event. Running a QMP query command periodically can potentially detect a faulted or crashed VM, and notify the cloud manager to take appropriate action.

These monitoring techniques can also be used in any compute, storage, and network overlay environment such as hybrid cloud and other VM migration solutions. The data collected by the container can be sent on demand or periodically to the cloud manager. Parameters for data transfer can be set and managed by the enterprise IT administrator. The data can be analyzed and messages, e.g., warning or fatal error messages, may be sent to the guest VM via the overlay network.

The techniques described herein further involve determining that processing requirements for the virtual machine exceed the processing resources allocated to the first virtual machine interface and starting a second virtual machine interface provisioned with a greater processing resource allocation than the first virtual machine interface. The virtual machine is migrated from the first virtual machine interface to the second virtual machine interface.

A failure may be detected in the first cloud gateway or in the connection. A third cloud gateway is started in the first virtual network and a connection is established between the third cloud gateway and the second cloud gateway. The third cloud gateway may already be started and configured as a "hot" spare for the first gateway.

It may be determined that a software image upgrade should be performed for the first cloud gateway and a third cloud gateway is started in the first virtual network using the software image upgrade. A connection between the third cloud gateway and the second cloud gateway is established, thereby completing the software upgrade. The first cloud gateway may then be taken down and replaced with a gateway using the upgraded software image.

A second CNE may be brought on line. A third cloud gateway may be started in the first virtual network. One or more third messages are sent to the second virtual network, the one or more third messages comprising information configured to start a fourth cloud gateway and a second virtual switch in the second virtual network. A connection is established between the third cloud gateway and the fourth cloud gateway, where the third cloud gateway, the fourth cloud gateway, and the second virtual switch form a second scalable cloud network element. A determination as to whether cloud resources associated with the second scalable cloud network element are more lightly loaded than cloud resources associated with the first scalable cloud network element and the virtual machine is migrated from the first virtual switch to the second virtual switch when the cloud resources associated with the second scalable cloud network element are more lightly loaded than cloud resources associated with the first scalable cloud network element.

The third cloud gateway may be started with a greater processing capacity than the first cloud gateway and the one or more third messages may be sent that are configured to start the fourth cloud gateway and second virtual switch with a greater processing capacity than the second cloud gateway and the first virtual switch. It is determined whether a performance of the virtual machine would be improved by operating the virtual machine with the second scalable cloud network element. The virtual machine is migrated from the first virtual switch to the second virtual switch when the performance of the virtual machine would be improved.

In summary, the techniques described herein are provided for a management application to start a first cloud gateway in the first virtual network. One or more first messages are sent to a second virtual network, the one or more first messages comprising information configured to start a second cloud gateway and a first virtual switch in the second virtual network. A connection is established between the first cloud gateway and the second cloud gateway, where the first cloud gateway, the second cloud gateway, and the first virtual switch form a first scalable cloud network element. One or more second messages are sent to the second virtual network, the one or more second messages comprising information configured to start a virtual machine and a first virtual machine interface configured to allow the virtual machine to access processing resources in the second virtual network. Data are stored that associates the virtual machine with the first virtual switch. The first virtual machine interface monitors one or more performance parameters for the virtual machine, and a message is sent from the second virtual network to the first virtual network, the message comprising information that represents the one or more performance parameters.

These techniques provide for an intelligent auto-scaling overlay network. This overlay network can handle elastic bandwidth requirements, as well as automatically handle failovers. The techniques described offer several advantages over conventional hybrid clouds, including: 1) dynamic overlay network component instantiation that provides the flexibility of processing bandwidth allocation in a virtualized environment, 2) close cloud management monitoring of the needs of network bandwidth and allocating of overlay network computing resources on an on-demand basis, 3) improved user experience when computing resources for the overlay network are properly allocated, 4) fine tuning of the bandwidth requirements for a hybrid cloud overlay network, and 5) application of the auto-scaling techniques to overlay network failovers as well as software upgrades.

The above description is intended by way of example only.

What is claimed is:

1. A method comprising:
   at a management application in a first virtual network, starting a first cloud gateway virtual network element in the first virtual network;
   sending to a second virtual network, across a public network and via the first cloud gateway, one or more first messages comprising information configured to start a second cloud gateway virtual network element and a first virtual switch in the second virtual network;
   establishing a connection between the first cloud gateway virtual network element and the second cloud gateway virtual network element, wherein the first cloud gateway virtual network element, the second cloud gateway virtual network element, and the first virtual switch form a first scalable cloud network element that is capable of operating virtual machines in both the first virtual network and the second virtual network;
   sending from the first virtual network to the second virtual network one or more second messages comprising information configured to start a virtual machine and a first virtual machine interface configured to allow the virtual machine to access processing resources in the second virtual network; and
   storing data that associates the virtual machine with the first virtual switch.

2. The method of claim 1, further comprising:
   monitoring by the first virtual machine interface one or more performance parameters for the virtual machine; and
   sending from the second virtual network to the first virtual network a message comprising information that represents the one or more performance parameters.

3. The method of claim 1, further comprising:
   determining that processing requirements for the virtual machine exceed the processing resources allocated to the first virtual machine interface;
   starting a second virtual machine interface provisioned with a greater processing resource allocation than the first virtual machine interface; and
   migrating the virtual machine from the first virtual machine interface to the second virtual machine interface.

4. The method of claim 1, further comprising:
   detecting that a failure has occurred in the first cloud gateway virtual network element or in the connection;
   starting a third cloud gateway virtual network element in the first virtual network; and
   establishing a connection between the third cloud gateway virtual network element and the second cloud gateway virtual network element.

5. The method of claim 1, further comprising:
   determining that a software image upgrade should be performed for the first cloud gateway virtual network element;
   starting a third cloud gateway virtual network element using the software image upgrade in the first virtual network; and
   establishing a connection between the third cloud gateway virtual network element and the second cloud gateway virtual network element.

6. The method of claim 1, further comprising:
   starting a third cloud gateway virtual network element in the first virtual network;
   sending to the second virtual network one or more third messages comprising information configured to start a fourth cloud gateway virtual network element and a second virtual switch in the second virtual network; and
   establishing a connection between the third cloud gateway virtual network element and the fourth cloud gateway virtual network element, wherein the third cloud gateway virtual network element, the fourth cloud gateway virtual network element, and the second virtual switch form a second scalable cloud network element.

7. The method of claim 6, further comprising:
   determining whether cloud resources associated with the second scalable cloud network element are more lightly loaded than cloud resources associated with the first scalable cloud network element; and
   migrating the virtual machine from the first virtual switch to the second virtual switch when the cloud resources associated with the second scalable cloud network element are more lightly loaded than cloud resources associated with the first scalable cloud network element.

8. The method of claim 6, wherein starting the third cloud gateway virtual network element comprises starting the third cloud gateway virtual network element with a greater processing capacity than the first cloud gateway virtual network element, and wherein sending one or more third messages comprises sending one or more third messages configured to start the fourth cloud gateway virtual network element and the second virtual switch with a greater processing capacity than the second cloud gateway virtual network element and the first virtual switch, and further comprising:
   determining whether performance of the virtual machine would be improved by operating the virtual machine with the second scalable cloud network element; and
   migrating the virtual machine from the first virtual switch to the second virtual switch when the performance of the virtual machine would be improved.

9. An apparatus comprising:
   one or more network interfaces configured to interface with a network; and
   a processor coupled to the one or more network interfaces, and configured to:
      start a first cloud gateway virtual network element in a first virtual network;
      send to a second virtual network, across a public network and via the first cloud gateway, one or more first messages comprising information configured to start a second cloud gateway virtual network element and a first virtual switch in a second virtual network;
      establish a connection between the first cloud gateway virtual network element and the second cloud gateway virtual network element, wherein the first cloud gateway virtual network element, the second cloud gateway virtual network element, and the first virtual switch form a first scalable cloud network element that is capable of operating virtual machines in both the first virtual network and the second virtual network;

send from the first virtual network to the second virtual network one or more second messages comprising information configured to start a virtual machine and a first virtual machine interface configured to allow the virtual machine to access processing resources in the second virtual network; and store data that associates the virtual machine with the first virtual switch.

10. The apparatus of claim 9, wherein the processor is further configured to:

determine that processing requirements for the virtual machine exceed the processing resources allocated to the first virtual machine interface;

start a second virtual machine interface provisioned with a greater processing resource allocation than the first virtual machine interface; and migrate the virtual machine from the first virtual machine interface to the second virtual machine interface.

11. The apparatus of claim 9, wherein the processor is further configured to:

detect that a failure has occurred in the first cloud gateway virtual network element or in the connection;

start a third cloud gateway virtual network element in the first virtual network; and establish a connection between the third cloud gateway virtual network element and the second cloud gateway virtual network element.

12. The apparatus of claim 9, wherein the processor is further configured to:

determine that a software image upgrade should be performed for the first cloud gateway virtual network element;

start a third cloud gateway virtual network element using the software image upgrade in the first virtual network; and establish a connection between the third cloud gateway virtual network element and the second cloud gateway virtual network element.

13. The apparatus of claim 9, wherein the processor is further configured to:

start a third cloud gateway virtual network element in the first virtual network;

send to the second virtual network one or more third messages comprising information configured to start a fourth cloud gateway virtual network element and a second virtual switch in the second virtual network; and establish a connection between the third cloud gateway virtual network element and the fourth cloud gateway virtual network element, wherein the third cloud gateway virtual network element, the fourth cloud gateway virtual network element, and the second virtual switch form a second scalable cloud network element.

14. The apparatus of claim 13, wherein the processor is further configured to:

determine whether cloud resources associated with the second scalable cloud network element are more lightly loaded than cloud resources associated with the first scalable cloud network element; and migrate the virtual machine from the first virtual switch to the second virtual switch when the cloud resources associated with the second scalable cloud network element are more lightly loaded than cloud resources associated with the first scalable cloud network element.

15. The apparatus of claim 13, wherein the processor is further configured to:

start the third cloud gateway virtual network element with a greater processing capacity than the first cloud gateway virtual network element;

send the one or more third messages configured to start the fourth cloud gateway virtual network element and the second virtual switch with a greater processing capacity than the second cloud gateway virtual network element and the first virtual switch;

determine whether a performance of the virtual machine would be improved by operating the virtual machine with the second scalable cloud network element; and migrate the virtual machine from the first virtual switch to the second virtual switch when the performance of the virtual machine would be improved.

16. One or more non-transitory computer readable storage media storing instructions that, when executed by a processor, cause the processor to:

start a first cloud gateway virtual network element in a first virtual network;

send to a second virtual network, across a public network and via the first cloud gateway, one or more first messages comprising information configured to start a second cloud gateway virtual network element and a first virtual switch in a second virtual network;

establish a connection between the first cloud gateway virtual network element and the second cloud gateway virtual network element, wherein the first cloud gateway virtual network element, the second cloud gateway virtual network element, and the first virtual switch form a first scalable cloud network element that is capable of operating virtual machines in both the first virtual network and the second virtual network;

send from the first virtual network to the second virtual network one or more second messages comprising information configured to start a virtual machine and a first virtual machine interface configured to allow the virtual machine to access processing resources in the second virtual network; and store data that associates the virtual machine with the first virtual switch.

17. The computer readable storage media of claim 16, further comprising instructions that, when executed by a processor, cause the processor to:

determine that processing requirements for the virtual machine exceed the processing resources allocated to the first virtual machine interface;

start a second virtual machine interface provisioned with a greater processing resource allocation than the first virtual machine interface; and migrate the virtual machine from the first virtual machine interface to the second virtual machine interface.

18. The computer readable storage media of claim 16, further comprising instructions that, when executed by a processor, cause the processor to:

detect that a failure has occurred in the first cloud gateway virtual network element or in the connection;

start a third cloud gateway virtual network element in the first virtual network; and establish a connection between the third cloud gateway virtual network element and the second cloud gateway virtual network element.

19. The computer readable storage media of claim 16, further comprising instructions that, when executed by a processor, cause the processor to:

determine that a software image upgrade should be performed for the first cloud gateway virtual network element;

start a third cloud gateway virtual network element using the software image upgrade in the first virtual network; and establish a connection between the third cloud gateway virtual network element and the second cloud gateway virtual network element.

20. The computer readable storage media of claim 16, further comprising instructions that, when executed by a processor, cause the processor to:

start a third cloud gateway virtual network element in the first virtual network;

send to the second virtual network one or more third messages comprising information configured to start a fourth cloud gateway virtual network element and a second virtual switch in the second virtual network; and establish a connection between the third cloud gateway virtual network element and the fourth cloud gateway virtual network element, wherein the third cloud gateway virtual network element, the fourth cloud gateway virtual network element, and the second virtual switch form a second scalable cloud network element.

21. The computer readable storage media of claim 20, further comprising instructions that, when executed by a processor, cause the processor to:

determine whether cloud resources associated with the second scalable cloud network element are more lightly loaded than cloud resources associated with the first scalable cloud network element; and migrate the virtual machine from the first virtual switch to the second virtual switch when the cloud resources associated with the second scalable cloud network element are more lightly loaded than cloud resources associated with the first scalable cloud network element.

22. The computer readable storage media of claim 20, further comprising instructions that, when executed by a processor, cause the processor to:

start the third cloud gateway virtual network element with a greater processing capacity than the first cloud gateway virtual network element;

send the one or more third messages configured to start the fourth cloud gateway virtual network element and the second virtual switch with a greater processing capacity than the second cloud gateway virtual network element and the first virtual switch, and further comprising:

determine whether a performance of the virtual machine would be improved by operating the virtual machine with the second scalable cloud network element; and migrate the virtual machine from the first virtual switch to the second virtual switch when the performance of the virtual machine would be improved.

* * * * *